United States Patent
Lipstone et al.

(10) Patent No.: US 11,329,877 B1
(45) Date of Patent: May 10, 2022

(54) TIERED UPDATING OF CONFIGURATION DATA IN A CONTENT DELIVERY NETWORK

(71) Applicant: Level 3 Communications, LLC, Broomfield, CO (US)

(72) Inventors: Laurence Lipstone, Calabasas, CA (US); Daniel Jensen, Lake Balboa, CA (US); William Power, Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 17/362,108

(22) Filed: Jun. 29, 2021

Related U.S. Application Data

(60) Provisional application No. 63/139,082, filed on Jan. 19, 2021.

(51) Int. Cl.
| | |
|---|---|
| *G06F 15/177* | (2006.01) |
| *H04L 41/0816* | (2022.01) |
| *H04L 41/12* | (2022.01) |
| *H04L 41/0896* | (2022.01) |
| *H04L 41/0893* | (2022.01) |

(52) U.S. Cl.
CPC ...... *H04L 41/0816* (2013.01); *H04L 41/0893* (2013.01); *H04L 41/0896* (2013.01); *H04L 41/12* (2013.01)

(58) Field of Classification Search
CPC ............ H04L 41/0816; H04L 41/0893; H04L 41/0896; H04L 41/12
See application file for complete search history.

(56) References Cited

U.S. PATENT DOCUMENTS

| | | | |
|---|---|---|---|
| 6,810,428 B1 * | 10/2004 | Larsen | H04L 45/02 709/239 |
| 9,893,940 B1 | 2/2018 | Chawla | |
| 2013/0159472 A1 | 6/2013 | Newton et al. | |
| 2021/0036912 A1 * | 2/2021 | Madappa | H04L 41/0863 |

OTHER PUBLICATIONS

International Search Report and Written Opinion of the International Searching Authority, dated Sep. 23, 2021, Int'l Appl. No. PCT/US21/039570, Int'l Filing Date Jun. 29, 2021; 12 pgs.

* cited by examiner

*Primary Examiner* — Wing F Chan
*Assistant Examiner* — Joseph R Maniwang

(57) ABSTRACT

Examples described herein relate to systems and methods for tiered updating of configuration data. Updated configuration data is transmitted to different tiers of nodes. The nodes of a first tier are commanded to use the updated configuration data. After waiting to see if any nodes of the first tier communicate a fault after using the updated configuration data, for each of the additional tiers in the CDN it is sequentially repeated to: transmit a command to the nodes of that additional tier to use the updated configuration data; and after waiting to see if any nodes of any tier communicate a fault after using the updated configuration data, transmitting a command to the nodes of another additional tier to use the updated configuration data.

24 Claims, 5 Drawing Sheets

```
                                                              ← 101

┌─────────────────────────────────┬─────────────────────────────────┐
│ 102                             │ 103                    12:00 PM │
│  ┌──────┐ ┌──────┐ ┌──────┐     │  ┌──────┐ ┌──────┐ ┌──────┐     │
│  │ N1-A │ │ N2-A │ │ N3-A │     │  │ N6-A │ │ N7-A │ │ N8-A │     │
│  │  OK  │ │  OK  │ │  OK  │     │  │  OK  │ │  OK  │ │  OK  │     │
│  └──────┘ └──────┘ └──────┘     │  └──────┘ └──────┘ └──────┘     │
│  ┌──────┐ ┌──────┐ ┌──────┐     │  ┌──────┐ ┌──────┐ ┌──────┐     │
│  │ N4-A │ │ N5-A │ │Stop/ │     │  │ N9-A │ │N10-A │ │Stop/ │     │
│  │  OK  │ │  OK  │ │Revert?│    │  │  OK  │ │  OK  │ │Revert?│    │
│  └──────┘ └──────┘ └──────┘     │  └──────┘ └──────┘ └──────┘     │
├─────────────────────────────────┼─────────────────────────────────┤
│ 104                             │ 105                             │
│  ┌──────┐ ┌──────┐ ┌──────┐     │  ┌──────┐ ┌──────┐ ┌──────┐     │
│  │N11-A │ │N12-A │ │N13-A │     │  │N16-A │ │N17-A │ │N18-A │     │
│  │  OK  │ │  OK  │ │  OK  │     │  │  OK  │ │  OK  │ │  OK  │     │
│  └──────┘ └──────┘ └──────┘     │  └──────┘ └──────┘ └──────┘     │
│  ┌──────┐ ┌──────┐ ┌──────┐     │  ┌──────┐ ┌──────┐ ┌──────┐     │
│  │N14-A │ │N15-A │ │Stop/ │     │  │N19-A │ │N20-A │ │Stop/ │     │
│  │  OK  │ │  OK  │ │Revert?│    │  │  OK  │ │  OK  │ │Revert?│    │
│  └──────┘ └──────┘ └──────┘     │  └──────┘ └──────┘ └──────┘     │
└─────────────────────────────────┴─────────────────────────────────┘
```

FIG. 2A

```
┌─────────────────────────────────┬─────────────────────────────────┐
│ 102                             │ 103                     1:00 PM │
│  ┌──────┐ ┌──────┐ ┌──────┐     │  ┌──────┐ ┌──────┐ ┌──────┐     │
│  │ N1-B │ │ N2-B │ │ N3-B │     │  │ N6-A │ │ N7-A │ │ N8-A │     │
│  │  OK  │ │  OK  │ │  OK  │     │  │  OK  │ │  OK  │ │  OK  │     │
│  └──────┘ └──────┘ └──────┘     │  └──────┘ └──────┘ └──────┘     │
│  ┌──────┐ ┌──────┐ ┌──────┐     │  ┌──────┐ ┌──────┐ ┌──────┐     │
│  │ N4-B │ │ N5-B │ │Stop/ │     │  │ N9-A │ │N10-A │ │Stop/ │     │
│  │  OK  │ │  OK  │ │Revert?│    │  │  OK  │ │  OK  │ │Revert?│    │
│  └──────┘ └──────┘ └──────┘     │  └──────┘ └──────┘ └──────┘     │
├─────────────────────────────────┼─────────────────────────────────┤
│ 104                             │ 105                             │
│  ┌──────┐ ┌──────┐ ┌──────┐     │  ┌──────┐ ┌──────┐ ┌──────┐     │
│  │N11-A │ │N12-A │ │N13-A │     │  │N16-A │ │N17-A │ │N18-A │     │
│  │  OK  │ │  OK  │ │  OK  │     │  │  OK  │ │  OK  │ │  OK  │     │
│  └──────┘ └──────┘ └──────┘     │  └──────┘ └──────┘ └──────┘     │
│  ┌──────┐ ┌──────┐ ┌──────┐     │  ┌──────┐ ┌──────┐ ┌──────┐     │
│  │N14-A │ │N15-A │ │Stop/ │     │  │N19-A │ │N20-A │ │Stop/ │     │
│  │  OK  │ │  OK  │ │Revert?│    │  │  OK  │ │  OK  │ │Revert?│    │
│  └──────┘ └──────┘ └──────┘     │  └──────┘ └──────┘ └──────┘     │
└─────────────────────────────────┴─────────────────────────────────┘
```

FIG. 2B

| 102 | | | 103 | | 2:00 PM |
|---|---|---|---|---|---|
| N1-B OK | N2-B OK | N3-B OK | N6-B OK | N7-B OK | N8-B OK |
| N4-B OK | N5-B OK | Stop/ Revert? | N9-B OK | N10-B OK | Stop/ Revert? |
| 104 | | | 105 | | |
| N11-A OK | N12-A OK | N13-A OK | N16-A OK | N17-A OK | N18-A OK |
| N14-A OK | N15-A OK | Stop/ Revert? | N19-A OK | N20-A OK | Stop/ Revert? |

FIG. 2C

| 102 | | | 103 | | 3:00 PM |
|---|---|---|---|---|---|
| N1-B OK | N2-B OK | N3-B OK | N6-B OK | N7-B OK | N8-B OK |
| N4-B OK | N5-B OK | Stop/ Revert? | N9-B OK | N10-B OK | Stop/ Revert? |
| 104 | | | 105 | | |
| N11-B OK | N12-B OK | N13-B OK | N16-A OK | N17-A OK | N18-A OK |
| N14-B OK | N15-B OK | Stop/ Revert? | N19-A OK | N20-A OK | Stop/ Revert? |

FIG. 2D

| 102 | | | 103 | | 4:00 PM |
|---|---|---|---|---|---|
| N1-B OK | N2-B OK | N3-B OK | N6-B OK | N7-B OK | N8-B OK |
| N4-B OK | N5-B OK | Stop/Revert? | N9-B OK | N10-B OK | Stop/Revert? |
| 104 | | | 105 | | |
| N11-B OK | N12-B OK | N13-B OK | N16-B OK | N17-B OK | N18-B OK |
| N14-B OK | N15-B OK | Stop/Revert? | N19-B OK | N20-B OK | Stop/Revert? |

FIG. 2E

| 102 | | | 103 | | 2:15 PM |
|---|---|---|---|---|---|
| N1-B OK | N2-B OK | N3-B OK | N6-B OK | N7-B OK | N8-B OK |
| N4-B OK | N5-B OK | Stop/Revert? | N9-B FAULT | N10-B FAULT | Stop/Revert? |
| 104 | | | 105 | | |
| N11-A OK | N12-A OK | N13-A OK | N16-A OK | N17-A OK | N18-A OK |
| N14-A OK | N15-A OK | Stop/Revert? | N19-A OK | N20-A OK | Stop/Revert? |

FIG. 3

TIERED UPDATING OF CONFIGURATION DATA IN A CONTENT DELIVERY NETWORK

CROSS-REFERENCE TO RELATED APPLICATIONS

This application claims the benefit of U.S. Provisional Patent Application No. 63/139,082, filed Jan. 19, 2021 and entitled "Tiered Updating of Configuration Data in a Content Delivery Network," the entire contents of which are incorporated by reference herein.

BACKGROUND

A content delivery network (CDN) includes a geographically distributed network of servers configured for facilitating distribution of content items (e.g., videos, images, website content data, and so on) from an origin server to clients that consume the content items. Each server in the CDN can be referred to as a node, a machine, a computer, and so on. To distribute the content items to clients that are geographically remote to the origin server, a node in geographical proximity to the clients can provide the content items to those clients on behalf of the origin server. Additional components in the CDN can participate in or control the distribution of content items to clients. For example, the CDN can include a control core that controls nodes in the CDN, e.g., regularly transmits updated configuration data such as commands for nodes to implement. Accordingly, if configuration data is faulty, it can be distributed to and implemented by multiple nodes in the CDN, which may cause the nodes' respective software applications implementing that configuration data to crash or otherwise misbehave in such a manner as to disrupt the distribution of content items in the CDN.

BRIEF SUMMARY

Provided herein are systems and methods for tiered updating of configuration data in a content delivery network (CDN).

Some examples herein provide a method for updating configuration data in a content delivery network (CDN) including nodes. The method may be implemented by a computer and may include transmitting updated configuration data to different tiers of the nodes. The method may include transmitting a command to the nodes of a first tier to use the updated configuration data. The method may include, after waiting to see if any nodes of the first tier communicate a fault after using the updated configuration data, sequentially repeating, for each of the additional tiers in the CDN: transmitting a command to the nodes of that additional tier to use the updated configuration data; and after waiting to see if any nodes of any tier communicate a fault after using the updated configuration data, transmitting a command to the nodes of another additional tier to use the updated configuration data.

In some examples, the nodes of the first tier do not handle content requests.

In some examples, the nodes of the first tier receive content requests from clients that are operated solely to test the operation of the CDN with the updated configuration data.

In some examples, the updated configuration data respectively is transmitted at different times to the different tiers of nodes.

In some examples, the method further includes, responsive to any nodes of any tier communicating a fault after using the updated configuration data, commanding the nodes of at least that tier to revert to earlier configuration data and not commanding any additional tiers of nodes to use the updated configuration data. In some examples, commanding a node to revert to earlier configuration data includes commanding that node to use an archive stored at that node to identify and use the earlier configuration data.

In some examples, nodes that handle content requests are mapped onto one of the additional tiers based on node identifiers.

In some examples, nodes that handle content requests are mapped onto one of the additional tiers based on a business rule. In some examples, the business rule includes one or more of: a sensitivity of the node to network traffic, that node's geographical area, a level of network traffic in that node's geographical area, a priority of a customer distributing content through that node, and a type of content being distributed through that node.

In some examples, at least some of the additional tiers include different numbers of nodes than one another.

In some examples, the computer includes a control core of the CDN.

Some examples herein provide a computer system including a processor and a network interface. The processor may be configured to implement operations including transmitting updated configuration data to different tiers of nodes. The operations may include transmitting a command to the nodes of a first tier to use the updated configuration data. The operations may include, after waiting to see if any nodes of the first tier communicate a fault after using the updated configuration data, sequentially repeating, for each of the additional tiers in the CDN: transmitting a command to the nodes of that additional tier to use the updated configuration data; and after waiting to see if any nodes of any tier communicate a fault after using the updated configuration data, transmitting a command to the nodes of another additional tier to use the updated configuration data.

In some examples, the nodes of the first tier do not handle content requests.

In some examples, the nodes of the first tier receive content requests from clients that are operated solely to test the operation of the CDN with the updated configuration data.

In some examples, the updated configuration data is transmitted at different times to the tiers of nodes.

In some examples, the operations further include, responsive to any nodes of any tier communicating a fault after using the updated configuration data, commanding the nodes of at least that tier to revert to earlier configuration data and not commanding any additional tiers of nodes to use the updated configuration data. In some examples, commanding a node to revert to earlier configuration data includes commanding that node to use an archive stored at that node to identify and use the earlier configuration data.

In some examples, nodes that handle content requests are mapped onto one of the additional tiers based on node identifiers.

In some examples, nodes that handle content requests are mapped onto one of the additional tiers based on a business rule. In some examples, the business rule includes one or more of: a sensitivity of the node to network traffic, that node's geographical area, a level of network traffic in that node's geographical area, a priority of a customer distributing content through that node, and a type of content being distributed through that node.

In some examples, at least some of the additional tiers include different numbers of nodes than one another.

In some examples, the computer system includes a control core of a content delivery network (CDN).

Some examples herein provide a method for updating configuration data in a network. The method may be implemented by a computer and may include transmitting updated configuration data to different tiers of computers. The method may include transmitting a command to the computers of the first tier to use the updated configuration data. The method may include, after waiting to see if any computers of the first tier communicate a fault after using the updated configuration, sequentially repeating, for each of the additional tiers in the network: transmitting a command to the computers of that additional tier to use the updated configuration data; and after waiting to see if any computers of any tier communicate a fault after using the updated configuration data, transmitting a command to the computers of another additional tier to use the updated configuration data.

Some examples herein provide a computer system including a processor and a network interface. The processor may be configured to implement operations including transmitting updated configuration data to different tiers of computers. The operations may include transmitting a command to the computers of the first tier to use the updated configuration data. The operations may include, after waiting to see if any computers of the first tier communicate a fault after using the updated configuration, sequentially repeating, for each of the additional tiers in the network: transmitting a command to the computers of that additional tier to use the updated configuration data; and after waiting to see if any computers of any tier communicate a fault after using the updated configuration data, transmitting a command to the computers of another additional tier to use the updated configuration data.

These and other features, together with the organization and manner of operation thereof, will become apparent from the following detailed description when taken in conjunction with the accompanying drawings.

BRIEF DESCRIPTION OF THE DRAWINGS

FIGS. 2A-2E and 3 are diagrams of example operator interfaces that may be displayed using a control core in the CDN of FIG. 1, according to various embodiments.

DETAILED DESCRIPTION

Figure 1:
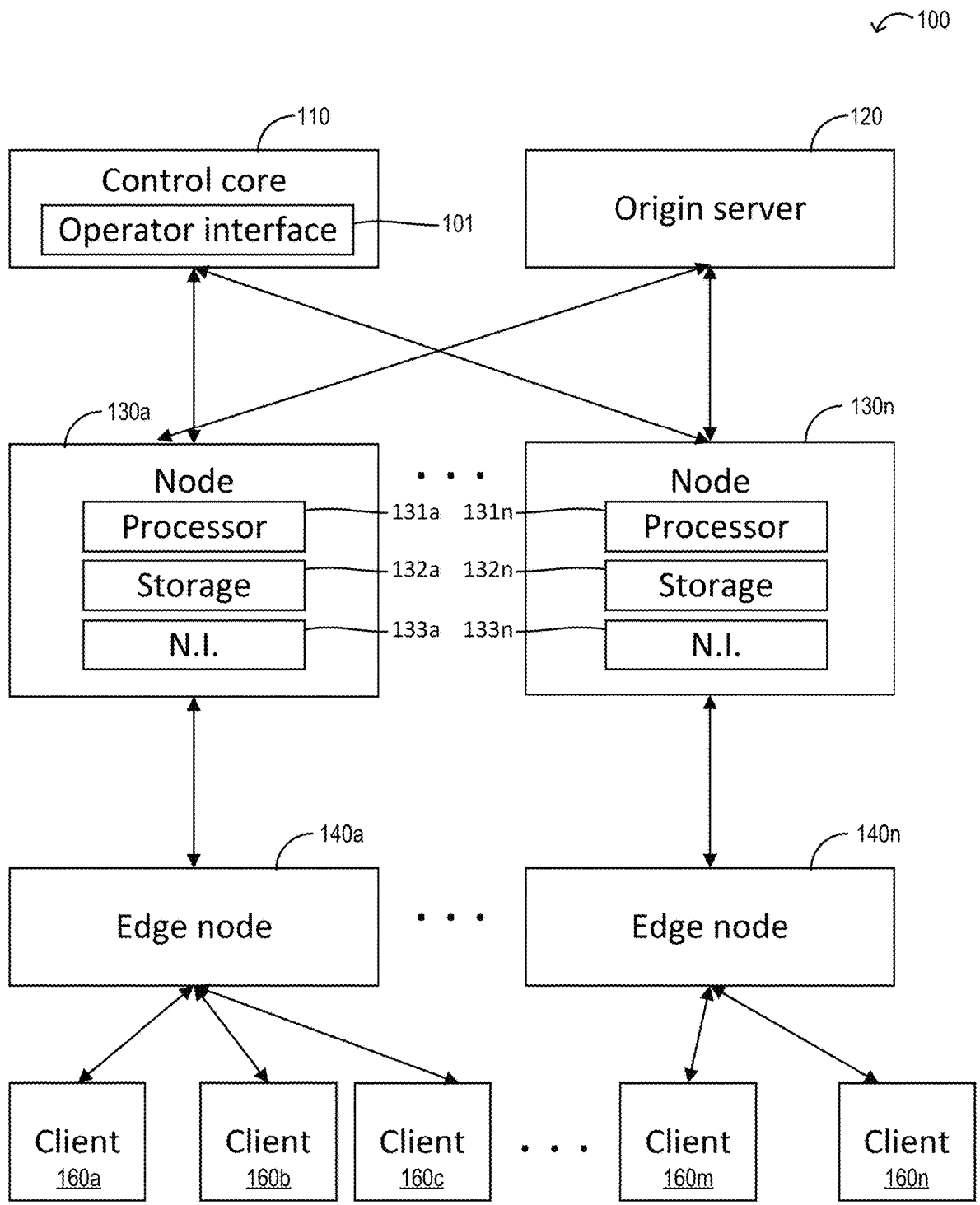
FIG. 1 is a diagram of a content delivery network (CDN) configured for tiered updating of configuration data, according to various embodiments.

Embodiments described herein relate to tiered updating of configuration data in a content delivery network (CDN). However, it should be appreciated that the present systems and methods may be implemented in any suitable computing environment and are not limited to CDNs.

In a CDN, which also may be referred to as a content delivery system, an edge node is a node that initially receives a request for one or more content items from a client. The client refers to a device operated by an end user who desires to consume or otherwise receive one or more of the content items provided by the origin server. The content item is or includes a portion, a segment, an object, a file, or a slice of data stored by the origin server and cached at various nodes throughout the CDN for provisioning to one or more of the clients, e.g., via one or more edge nodes. The origin server refers to a device operated by a customer of the CDN, which facilitates the customer in delivering the content items to respective clients. A control core may control the nodes in the CDN, e.g., may distribute updated configuration data to such nodes that independently include commands for the nodes to change configuration(s).

If configuration data is faulty, then the software application of the node that is implementing that configuration will misbehave. That is, as used herein, "faulty" configuration data is configuration data that causes a software application of a node to crash or otherwise misbehave when implementing that configuration data. By "misbehave" it is meant anything other than the desired normal behavior. By "crash" it is meant a misbehavior in which the software application being executed by the node terminates abnormally and possibly restarts. A crash may include an operating system crash. Other nonlimiting examples of misbehavior can include not serving customer content correctly (whether for all customers or for one or more customers), or increased CPU and/or memory usage caused, for example, by a new configuration exposing a bug in the software application, or the like. As such, within the framework of the application the configuration data may be legal (and thus may be validated during initial checks of the configuration data), but nevertheless may expose a bug during processing. Such processing may include normal processing, or the taking of unusual code paths in response to abnormal processing.

The control core of a CDN may not act upon the configuration data that it distributes, and as such may distribute faulty configuration data without having reason to know that such configuration data is faulty, unless and until a software application on a node misbehaves as a result of implementing the configuration data and a system operator eventually identifies the source of the misbehavior. Although nodes may be able to flag—and reject prior to implementing—certain types of faulty configuration data through the validation process, nodes nonetheless may successfully validate and then implement configuration data that eventually causes software applications running on those nodes to misbehave. If such configuration data is implemented on all of the nodes of the CDN, the entire CDN may become unstable or even unusable.

As provided herein, the nodes of a CDN may be updated in a tiered manner, such that only a first limited number, or "tier", of the nodes may be commanded to newly use updated configuration data at a given time. After waiting to see whether that updated configuration data causes the nodes of that first tier to misbehave, then a second tier of the nodes may be commanded to newly use the updated configuration data, while the first tier may continue to use the updated configuration data. In such a manner, additional tiers of the nodes sequentially may be commanded to use the updated configuration data, so long as any earlier tiers that are using the updated configuration data do not misbehave.

So as to provide an additional layer of protection to the CDN, the first tier of nodes optionally may be limited to nodes that do not handle any content requests, e.g., do not interface with any customers or clients, so as to test the updated configuration data without risking any disruptions to content distribution that otherwise may have been caused by misbehavior arising from the updated configuration data. Alternatively, the first tier of nodes may interface with clients that are operated solely to test the operation of the CDN with the updated configuration data. Additionally, or alternatively, so as to provide an additional layer of protection to the CDN, the order in which the different tiers of nodes are allowed to use the updated configuration data may be selected to expose less important or less sensitive nodes to the update before exposing more important or more sensitive nodes to the update. As such, if the updated configuration data causes one of the less important or less sensitive nodes to misbehave, the misbehavior may be less problematic than if that data were to cause one of the more important or more sensitive nodes to misbehave. Thus, each earlier tier of nodes that is newly exposed to the updated configuration data may be considered to "test" that update for the later tiers of nodes. The control core may be used to issue commands causing any or all of the nodes to revert to earlier configuration data. Such commands may be issued relatively quickly, e.g., in response to one or more nodes misbehaving after a configuration data update, and without the need to determine or even begin to analyze the root cause of the fault. As such, within minutes of the node(s) misbehaving, some or all of the node(s) may be reverted to an operable state at which they may distribute content. The cause of the misbehavior subsequently may be investigated and addressed while the nodes distribute content normally, albeit using an earlier version of configuration data. The control core subsequently may issue newly updated configuration data in a similarly tiered manner.

FIG. 1 is a diagram of a CDN 100 according to some embodiments. Referring to FIG. 1, the CDN 100 is configured for delivering content items provided by an origin server 120 to various clients 160a-160n via nodes 130a . . . 130n (which may be collectively referred to herein as nodes 130) and edge nodes 140a . . . 140n (which may be collectively referred to herein as nodes 140 or as edge nodes 140). Control core 110 distributes updated configuration data to nodes 130 and edge nodes 140, e.g., commands for such nodes to change configuration, and also may be configured to monitor the health (e.g., fault status) of nodes 130 and nodes 140. In some embodiments, control core 110 may include operator interface 101 via which the health and configuration data version being used by nodes 130 and 140 may be displayed to an operator, and which may be used to receive input from the operator instructing that configuration data of any suitable ones (or all) of nodes 130 and nodes 140 be reverted to an earlier version in a manner such as described in greater detail herein. The operator interface need not necessarily be co-located with control core 110. Additionally, or alternatively, control core 110 may be configured to automatically revert the configuration data of any suitable ones (or all) of nodes 130 and nodes 140 be reverted to an earlier version, e.g., if one or more of the nodes using updated configuration data begins to misbehave.

A user of a respective one of the clients 160a-160n may request and receive the content items provided by the origin server 120 via node(s) 130, 140. In some embodiments, each of the clients 160a-160n can be a desktop computer, mainframe computer, laptop computer, pad device, smart phone device, or the like, configured with hardware and software to perform operations described herein. For example, each of the clients 160a-160n includes a network device and a user interface. The network device is configured to connect the clients 160a-160n to a node (e.g., an edge node 140) of the CDN 100. The user interface is configured for outputting (e.g., displaying media content, games, information, and so on) based on the content items as well as receiving user input from the users.

In some examples, the CDN 100 is configured for delivering and distributing the content items originating from the origin server 120 to the clients 160a-160n. For example, the CDN 100 includes nodes 130, 140, where the origin server 120 is connected directly or indirectly to some or all of nodes 130a . . . 130n, and each of nodes 130a . . . 130n is connected directly or indirectly to at least one corresponding edge node 140a . . . 140n. The control core 110, origin server 120, the nodes 130, the edge nodes 140, and any other components in the CDN 100 can be located in different locations, thus forming the geographically distributed CDN 100. While there can be additional nodes between the nodes 130 and the origin server 120, the nodes 130 can be directly connected to the origin server 120, or the nodes 130 can be the origin server 120. In some configurations, nodes 130, and edge nodes 140 may be configured to implement the present functionality for updating configuration data that is distributed by control core 110.

The content items of the origin server 120 can be replicated and cached in multiple locations (e.g., multiple nodes) throughout the CDN 100, including in the nodes 130, 140 and other nodes (not shown). As used herein, the node 130 refers to any node in the CDN 100 (between the origin server 120 and the edge node 140) that stores copies of content items provided by the origin server 120. The origin server 120 refers to the source of the content items. The origin server 120 can belong to a customer (e.g., a content owner, content publisher, or a subscriber of the system 100) of the CDN 100 such that the customer pays a fee for using the CDN 100 to deliver the content items. Examples of content items include, but are not limited to, webpages and web objects (e.g., text, graphics, scripts, and the like), downloadable objects (e.g., media files, software, documents, and the like), live streaming media, on-demand streaming media, social networks, and applications (e.g., online multiplayer games, dating applications, e-commerce applications, portals, and the like), and so on.

The nodes 130, 140, and any other nodes (not shown) between the edge nodes 140 and the origin server 120 form a "backbone" of the CDN 100, providing a path from the origin server 120 to the clients 160a-160n. The nodes 130 are upstream with respect to the edge nodes 140 given that the nodes 130 are between respective edge nodes 140 and the origin server 120 as well as control core 110, the edge nodes 140 are downstream of nodes 130, and nodes 130 are downstream of origin server 120 and control core 110. In some embodiments, the edge node 140 is referred to as an "edge node" given the proximity of the edge node 140 to the clients 160a-160n. In some embodiments, the node 130 (and any other nodes between the node 130 and the origin server 120 not shown) is referred to as an "intermediate node." The intermediate nodes link the edge nodes 140 to the origin server 120 and to control core 110 via various network links or "hops." The intermediate nodes can provide the content items (and updates thereof) to the edge nodes, and also can distribute updated configuration data to the edge nodes. That is, the origin server 120 can provide the content items (and updates thereof) to the edge node 140 through the node 130, if the edge node 140 does not currently cache a copy of the content items respectively requested by the clients 160a-160n. Additionally, control core 110 can provide updated configuration data to the edge nodes 140 through the nodes 130.

Each link between one of the clients 160a-160n and the edge node 140 corresponds to a suitable network connection for exchanging data, such as content items or configuration data. In addition, each link between the nodes/servers 130, 140, . . . , 110, and 120 represents a suitable network connection for exchanging data such as content items or configuration data. A network connection is structured to permit the exchange of content items and configuration data, e.g., data, values, instructions, messages, and the like, among the clients 160a-160n, the nodes 130, 140, and so on, and the control core 110 and origin server 120 in the manner shown. The network connection can be any suitable Local Area Network (LAN) or Wide Area Network (WAN) connection. For example, each network link can be supported by Frequency Division Multiple Access (FDMA), Time Division Multiple Access (TDMA), Synchronous Optical Network (SONET), Dense Wavelength Division Multiplexing (DWDM), Optical Transport Network (OTN), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like.

As provided herein, control core 110 may gradually roll out (distribute and command to use) updated configuration data to nodes 130 and 140 in a tiered manner across the nodes of CDN 100, based on the tiers to which the nodes respectively may be mapped in a manner such as described in greater detail below. Examples of configuration data that may be rolled out in a tiered manner by control core 110 include, but are not limited to, commands for downstream nodes (such as one or both of nodes 130 and 140) to change configuration. Nonlimiting examples of commands to change configuration that control core 110 may include within updated configuration data include, but are not limited to, change configuration for a particular customer, use certificates, or change a configuration setting such as, illustratively, to refer to a new geographic information database. Any given version of configuration data distributed by control core 110 to nodes 130 and 140 may be faulty, e.g., may contain an error that would cause a software application running on a node in CDN 100 (e.g., one or more of nodes 130, 140) to misbehave. The faultiness of that configuration data may be inadvertent, e.g., may include an inadvertent command error that would cause the software application to misbehave, or may contain or point to data the processing of which causes the software application to misbehave. For example, the data may be faulty, and the software's correct processing of the faulty data causes misbehavior; illustratively, a geo database that contains incorrect country code information for a set of IP addresses may cause software to misbehave. Or, for example, the data may expose a latent fault in the software. Examples of inadvertent command errors include, but are not limited to, coding errors leading to unrecoverable processing faults, which may be most likely in failure recovery code paths, or attempts to allocate more resources (e.g., memory) than are available. However, it will be appreciated that the faultiness of that configuration data may be intentional, e.g., may include an intentional error, introduced by a malicious entity, that would cause the software application to misbehave.

Control core 110 may transmit various versions of configuration data to different tiers of nodes 130 and 140 at different times than one another or at the same time as one another, and at a given time respectively may command different tiers of nodes to use a particular one of those versions. The control core 110 may transmit a given version of configuration data to a given tier of nodes at an earlier time than when the control core commands that tier of nodes to use that version of the configuration data. For example, at a given time, one or more tiers of nodes 130 and 140 may store (e.g., in storage 132a . . . 132n) at least an earlier "A" version of configuration data, as well as an updated "B" version, each of which was received from control core 110, and may be using the "A" version. Control core 110 may transmit a command to a first tier of the nodes to switch from using the earlier "A" version to the updated "B" version, responsive to which the nodes of that first tier begin using the "B" version.

After the first tier of nodes has used the updated "B" version for a suitable amount of time to test whether the updated conversion data causes one or more nodes of that tier to misbehave, control core 110 sequentially may transmit respective commands to additional tiers of nodes to use the updated "B" version, one tier at a time and after waiting an additional amount of time to test whether any nodes of any tiers communicate errors after using the updated configuration data. For example, control core 110 may command a second tier of nodes to use "B," then may command a third tier of nodes to use "B," then may command a fourth tier of nodes to use "B," and so on. The commands may be transmitted at spaced intervals, e.g., so as to provide a suitable amount of time to test whether the updated conversion data causes one or more nodes of the previous tier(s) to misbehave. Spaced intervals between commands to new tiers may be the same length of time as one another, or may be different lengths of time than one another.

Responsive to nodes of any tier communicating a fault within a predefined period of time, control core 110 may not command any further tiers to begin using the updated "B" version of the configuration data. Additionally, control core 110 may command one or more of the tiers to revert to earlier configuration data, e.g., in a manner such as described in greater detail below. Illustratively, responsive to any of the nodes of the first tier communicate a fault after using the updated "B" version, control core 110 may command the nodes of that tier to revert to the earlier "A" version of the configuration data. Similarly, responsive to any of the nodes of any tier communicating a fault after using the updated "B" version, control core 110 may command the nodes of at least that tier to revert to the earlier "A" version and may not command any additional tiers of nodes to use the updated configuration data. As such, control core 110 may stop the rollout of the faulty updated "B" version on CDN 100 to additional tiers of nodes, and may revert nodes to the earlier "A" version. If it is determined that the updated configuration data is not causing the fault, then control core may continue to roll out the updated configuration data and need not command the nodes to revert to earlier configuration data.

A control core's commanding a node to revert to earlier configuration data may include commanding that node to use an archive stored at that node to identify and use the earlier configuration data ("A"). For example, as illustrated in FIG. 1, each of nodes 130a . . . 130n is a computer system that includes a respective processor 131a . . . 131n, storage 132a . . . 132n, and network interface (N.I.) 133a . . . 133n; nodes 140a . . . 140n may be configured similarly. Processors 131a . . . 131n (and similar processors in nodes 140) may be implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. Processors 131a . . . 131n respectively may include or may be coupled to storage 132a . . . 132n, e.g., a Random Access Memory (RAM), Read-Only Memory (ROM), Non-Volatile RAM (NVRAM), flash memory, hard disk storage, or another suitable data storage unit, which stores data and/or computer code for facilitating the various processes executed by the processors. The storage may be or include tangible, non-transient volatile memory or non-volatile memory. Accordingly, the storage may include database components, object code components, script components, or any other type of information structure for supporting the various functions described herein, such as an archive. Each storage 132a . . . 132n (and similar storage in nodes 140) can include a mass storage device, such as a hard disk drive or solid state drive. Network interfaces 133a . . . 133n (and similar network interfaces in nodes 140) include any suitable combination of hardware and software to establish communication with clients (e.g., the clients 160a-160n), other nodes in the CDN 100 such as respective edge nodes 140a . . . 140n, control core 110, and origin server 120 as appropriate. In some implementations, the network interfaces 133a . . . 133n include a cellular transceiver (configured for cellular standards), a local wireless network transceiver (for 802.11X, ZigBee, Bluetooth, Wi-Fi, or the like), a wired network interface, a combination thereof (e.g., both a cellular transceiver and a Bluetooth transceiver), and/or the like.

Processors 131a . . . 131n (and similar processors in nodes 140) may be configured to implement operations for updating or reverting configuration data in a manner such as provided herein. In examples such as illustrated in FIG. 1, each processor 131a . . . 131n may be configured to cause respective storage 132a . . . 132b to store each new version of updated configuration data that is received directly or indirectly from control core 110 via network interface 133a . . . 133n. The updated configuration data may be faulty or non-faulty. When the updated configuration data is faulty, the fault may be detected at the outset, or the fault may not be detectable until after the node implements the configuration data. For example, each processor 131a . . . 131n may be configured to validate the updated configuration data and to reject it if the configuration data is determined at the outset to be faulty, in which case the validation process itself protects the node 130 or 140 from implementing the faulty configuration data. In a nonlimiting, purely illustrative example in which the updated configuration data is a reference to a new geographical information database, the node may check whether the reference is in a valid format and whether the new database contains significantly less information than a previous database. Responsive to the updated configuration data not being faulty, processors 131a . . . 131n (may distribute content to clients 160a . . . 160n using the updated configuration data.

However, if the fault in the updated configuration data is of a nature that the validation process does not flag it, then the node 130 or 140 may implement the updated configuration data and subsequently misbehave as a result, e.g., when attempting to distribute content to clients 160a . . . 160n using the updated configuration data. Depending on the nature of the fault, the misbehavior may occur immediately or may be delayed. Storage 132a . . . 132n may store earlier configuration data, together with an identification of the version of that configuration data, for example, responsive to receiving and validating the updated configuration data from control core 110. Such earlier version of the configuration data may be used to protect nodes 130 and 140 from updated configuration data that includes a fault that is not detected prior to implementation, e.g., that is not detected during a pre-implementation validation process. The archive may store all earlier configuration data, or may store only the most recent version of earlier configuration data, or may store any suitable number of versions of earlier configuration data.

The archive of earlier configuration data may be used to revert node 130 or 140 to a configuration which is believed to be non-faulty. It will be appreciated that such archive may not be needed or used unless and until the node 130 or 140 implements updated configuration data that actually causes a fault which is communicated to control core 110 or which otherwise manifests itself, e.g., is reported by one or more customers. For example, processors of nodes 130 and 140 may be configured, responsive to the updated configuration data being faulty (e.g., causing a crash or other misbehavior), to communicate the fault to control core 110. Such communication may be performed expressly by transmitting a report from the node to control core 110 to report, illustratively, the node's resource consumption (e.g., memory or CPU) increasing even while maintaining otherwise healthy output, or the node exhibiting an increased rate of error responses (e.g., hypertext transfer protocol (HTTP) error responses). Alternatively, such communication may be performed implicitly, e.g., by the node going silent because the node has crashed, the node's resource consumption (e.g., memory or CPU) increasing even while maintaining otherwise healthy output, the node serving incorrect content, or the node exhibiting an increased rate of error responses (e.g., HTTP error responses). In still other examples, the fault is communicated to the control core 110 via an aggregate of nodes which are exhibiting more subtle symptoms of misbehavior that, if observed for a single node, may not necessarily suggest a problem.

In a manner such as described in greater detail below with reference to FIGS. 2A-2E and 3, responsive to receiving such a communication of the fault from a node, control core 110 may stop commanding any subsequent tiers of nodes to use the updated configuration data, and may transmit commands to the node 130 or 140 for use in reverting the nodes of that node's tier to use earlier configuration data. Responsive to suitable commands received from control core 110, node 130 or 140 reverts to an earlier version of configuration data, e.g., corresponding to a specific earlier version indicated in the commands, and distributes content using the reverted earlier configuration data. For example, the processor of node 130 or 140 may be configured to compare the configuration data version number (indicated in the commands from control core 110) to the respective version numbers of earlier configuration data stored in the archive, and to select a particular version of the earlier configuration data based on that comparison. The processor of node 130 or 140 may be configured to replace the updated configuration data (which is faulty) with the selected earlier configuration data and to use the selected earlier configuration data for distributing content normally. For example, the node 130 or 140 (or software application) may be instructed either to pick up the earlier configuration data or to restart (and thereby pick up the earlier configuration data). In this regard, although node 130 or 140 may not necessarily implement all configuration changes that may have been intended by control core 110 via the updated configuration data (e.g., may not necessarily implement specific configurations that are intended by customers of CDN 100), node 130 or 140 may continue to distribute content without that updated configuration, which likely is better than the node catastrophically failing due to a fault in that updated configuration. An additional benefit of being able to use locally stored, earlier configuration data is that it may be implemented quickly as compared to configuration data that would need to be distributed across CDN 100 in order to correct the fault.

As noted further above, control core 110 may be coupled to each of nodes 130 and 140 in such a manner as to transmit different versions of configuration data to such nodes, to issue commands to such nodes to use specific versions of such configuration data, to receive communication of fault from such nodes, and to issue commands to such nodes for use in reverting those nodes to earlier configuration data when appropriate. Control core 110 may include operator interface 101 via which the control core may communicate the fault status of nodes in CDN 100 to an operator and may receive input from the operator regarding reverting the configuration data of such nodes. The operator may use operator interface 101 to monitor the status of nodes in CDN 100 and to respond in an ad hoc manner to perceived misbehavior of nodes, e.g., by using operator interface 101 to issue commands from control core 110 to nodes 130 and 140. Additionally, or alternatively, control core 110 may be configured to automatically stop the rollout of a given version of configuration data to additional tiers of nodes and/or to revert any suitable tier(s) of nodes using that configuration data to an earlier version of the configuration data. As such, control core 110 may allow quick recovery to a known state based on time using simple commands that can be issued in any number of ways.

For example, FIGS. 2A-2E and 3 are diagrams of example operator interfaces that may be displayed using control core 110 in the CDN of FIG. 1, according to various embodiments. It will be appreciated that any suitable data may be displayed in any suitable manner via interface 101, and that use of such an interface is purely optional. As illustrated in FIG. 2A, interface 101 may display the configuration version and fault status of a plurality of tiers of nodes at the current time and day, and may provide an operator with the option to revert the configuration data of those tiers of nodes to an earlier version if appropriate. Each of the tiers may include a plurality of nodes. Illustratively, in the nonlimiting example shown in FIG. 2A, a first tier includes nodes N1, N2, N3, N4, and N5, configuration version and fault status of which are shown in region 102; a second tier includes nodes N6, N7, N8, N9, and N10, the configuration version and fault status of which are shown in region 103; a third tier includes nodes N11, N12, N13, N14, and N15, the configuration version and fault status of which are shown in region 104; and a fourth tier includes nodes N16, N17, N18, N19, and N20, the configuration version and fault status of which are shown in region 105. At the example time shown in FIG. 2A, 12:00 PM, it may be seen that each of the nodes in each of the tiers is using an earlier "A" version of the configuration data (e.g., "N1-A") and reports a fault-free status ("OK"). Nonlimiting examples of the number of tiers, and the mapping of any suitable nodes onto those tiers, are provided in greater detail elsewhere herein.

Interface 101 may display information that may be used to determine whether control core 110 should stop commanding any additional tiers of nodes to use updated configuration data and/or whether control core 110 should command any tiers of nodes to revert to earlier configuration data, e.g., if updated configuration data may have caused any of the tier's nodes to misbehave or otherwise communicate a fault. Note that control core 110 does not require the operator to determine a reason for the nodes' faults—or even to know with certainty which configuration data update was faulty or even whether it was truly a fault in the configuration data that caused the misbehavior—before deciding to stop a rollout of updated configuration data to additional tiers and/or to revert any tiers of nodes. As such, the operator may be able to instruct relatively quickly that the rollout should be stopped and/or that tier(s) of nodes should be reverted, and thus may help to restore tier(s) of nodes to a functional state within minutes. Illustratively, such instructions may be input to command core 110 by selecting a "Stop/Revert?" button which may be displayed for each tier in a manner such as illustrated in FIG. 2A, or via any other suitable interface. Alternatively, responsive to one or more communications of fault, control core 110 may automatically instruct that the rollout should be stopped and/or that tier(s) of nodes should be reverted.

In one nonlimiting, purely illustrative example, at 12:30 PM control core 110 transmits updated "B" configuration data to the first tier of nodes and commands the nodes of that tier to use the updated configuration data. It may be seen in FIG. 2B that at 1:00 PM (30 minutes after the configuration data update, the first tier of nodes N1 . . . N5 all indicate use of the "B" update (e.g., "N1-B") as well as an "OK" status, while the second, third, and fourth tiers of nodes all continue to indicate use of the "A" version and similarly an "OK" status. Continuing with this example, at 1:30 PM control core 110 transmits updated "B" configuration data to the second tier of nodes and commands the nodes of that tier to use the updated configuration data. It may be seen in FIG. 2C that at 2:00 PM (30 minutes after the configuration data update, the first and second tiers of nodes N1 . . . N5 and N6 . . . N10 all indicate use of the "B" update (e.g., "N6-B") as well as an "OK" status, while the third and fourth tiers of nodes all continue to indicate use of the "A" version and similarly an "OK" status. At 2:30 PM control core 110 transmits updated "B" configuration data to the third tier of nodes and commands the nodes of that tier to use the updated configuration data. It may be seen in FIG. 2D that at 3:00 PM (30 minutes after the configuration data update, the first, second, and third tiers of nodes N1 . . . N5, N6 . . . N10, and N11-N15 all indicate use of the "B" update (e.g., "N11-B") as well as an "OK" status, while the fourth tier of nodes continues to indicate use of the "A" version and similarly an "OK" status. At 3:30 PM control core 110 transmits updated "B" configuration data to the fourth tier of nodes and commands the nodes of that tier to use the updated configuration data. It may be seen in FIG. 2E that at 4:00 PM (30 minutes after the configuration data update, the first, second, third, and fourth tiers of nodes N1 . . . N5, N6 . . . N10, N11-N15, and N16 . . . N20 all indicate use of the "B" update (e.g., "N11-B") as well as an "OK" status. In this example, because each of the preceding tiers uses the updated configuration data without communicating a fault, control core 110 sequentially repeats the transmission of commands to the nodes of additional tiers to use the updated configuration data, and waits to see if any nodes of the first tier or of any additional tier communicate a fault after using the updated configuration data before commanding the nodes of another additional tier to use the updated configuration data. As such, the updated configuration may be gradually rolled out to all of the tiers of nodes 130, 140 in the CDN.

Alternatively, if any of the tier's nodes communicates a fault after using the updated configuration data, control core 110 may not command any subsequent tiers of nodes to use the updated configuration data, and may command any tiers of nodes that are using the updated configuration data to begin using the earlier configuration data instead. Illustratively, FIG. 3 corresponds to a time (2:15 PM) in the prior example after the first and second tiers of nodes have been commanded to use the updated configuration data, but in which nodes N9 and N10 of the second tier communicate "FAULT" after using the updated configuration data. For example, because the second tier of nodes are handling content requests whereas the first tier of nodes N1 . . . N5 do not handle content requests, an error within the updated configuration data may cause nodes N9 and N10 to take actions that nodes N1 . . . N5 do not and that cause misbehavior. Responsive to such communication of fault from nodes of the second tier, the control core 110 may not command the nodes of the third tier and fourth tiers to use the updated "B" configuration data, and the nodes of the first and/or second tiers may be commanded to revert to the earlier "A" configuration data. For example, an operator may select the "Stop/Revert?" button in region 103 of the interface which may cause control core 110 not to command the nodes of the third and fourth tiers to use the updated "B" configuration data, and to command the nodes of the first and/or second tiers to revert to the earlier "A" configuration data. For example, the interface may permit the operator to select any desired version of the configuration data to revert the first and/or second tiers of nodes to.

Note that edge nodes 140a . . . 140n may be configured similarly as nodes 130a . . . 130n with regards to reverting to earlier configuration data, e.g., respectively may include a processor configured similarly as processor 131a . . . 131n and storage device configured similarly as storage 132a . . . 132n to store an archive. Additionally, or alternatively, any other node(s) in CDN 100 may be configured similarly as nodes 130a . . . 130n with regards to reverting to earlier configuration data, e.g., respectively may include a processor configured similarly as processor 131a . . . 131n and storage device configured similarly as storage 132a . . . 132n to store an archive.

As noted elsewhere herein, the nodes 130, 140 of CDN 100 may be mapped onto tiers of nodes in any suitable manner, and any suitable number of tiers may be provided. Illustratively, CDN 100 may include at least 2 tiers of nodes, or at least 5 tiers of nodes, or at least 10 tiers of nodes, or at least 20 tiers of nodes, or at least 50 tiers of nodes, or at least 100 tiers of nodes, that control core 110 may sequentially cause to use updated configuration data, e.g., so long as no nodes of previously updated tiers communicate a fault after using the updated configuration data. Note that the configuration data may continue to be rolled out to new nodes even after a fault is communicated, e.g., if the control core 110 or the operator determines that the fault is unrelated to the new configuration, or if the operator determines that the benefit of continuing with the update outweighs the risk of introducing more faults. The tiers may include the same numbers of nodes as one another. Alternatively, at least some of the tiers may include different numbers of nodes than one another. The first tier that the control core 110 commands to use the updated configuration data optionally may include, or may consist essentially of, nodes that do not handle content requests. For example, the nodes of the first tier may not interface with any customers or clients, or the requests directed at the first tier may come from clients operated solely to test the operation of the CDN with the new configuration, and as such may not put operation of the CDN at risk if such nodes misbehave as a result of using the updated configuration data. The first tier of nodes may include a relatively low number of nodes, e.g., about 1-10 nodes, and there may be fifty or more additional tiers of nodes each of which may include any suitable number of nodes, e.g., about 1-10 nodes, or more than about 10 nodes, or more than about 20 nodes, or more than about 50 nodes, or more than about 100 nodes.

Additionally, or alternatively, nodes that are less sensitive or less important may be mapped into "lower" tiers that receive the updated configuration data earlier than do nodes that are more sensitive or more important and thus may be mapped into "higher" tiers. Illustratively, nodes that handle content requests (and thus may not be in the first tier) may be mapped onto (assigned to) one of many additional tiers based on node identifiers. For example, nodes respectively may be identified by unique alphanumeric identifiers. The nodes may be randomly mapped into the different tiers, e.g., by obtaining a hash of the nodes' alphanumeric identifiers and then mapping those alphanumeric identifiers, in ordinal rank, into tiers. However, such a mapping may result in nodes that are more sensitive or more important receiving updated configuration data relatively early, e.g., before that update has been tested on the nodes of a sufficient number of other tiers. Nodes that are more "sensitive" may include those that are more likely to misbehave after a configuration data update, may be in particular geographical areas, and/or that carry a relatively high level of network traffic (e.g., because of their geographical area). Nodes that are more "important" may include those that handle a particular customer's requests (e.g., a high profile or high paying customer), or that distribute a particular type of content (e.g., a live event for which delayed distribution may be catastrophic).

So as to improve protection of nodes that may be more sensitive or more important, nodes may be mapped onto tiers based on one or more business rules. Some nonlimiting examples of the business rule(s) may include one or more of a sensitivity of the node to network traffic, that node's geographical area, a level of network traffic in that node's geographical area, a priority of a customer distributing content through that node, and a type of content being distributed through that node. In one nonlimiting example, nodes that handle content requests initially may be mapped onto additional tiers based on node identifiers. The mapping then may be manually or automatically curated, e.g., using business rules. Illustratively, a node that is initially mapped into a "lower" tier may be moved into a "higher" tier because it is sensitive to network traffic, is in a particular geographical area, and/or is a geographical area that handles a particular level of network traffic. Additionally, or alternatively, a node that is initially mapped into a "lower" tier may be moved into a "higher" tier because it distributes the content of a high priority customer and/or distributes a particular type of content. Nodes may change tiers from time to time based on business rules. For example, a given node may be mapped onto a given tier at one time, and then may be mapped onto a different tier at another time.

Figure 4:
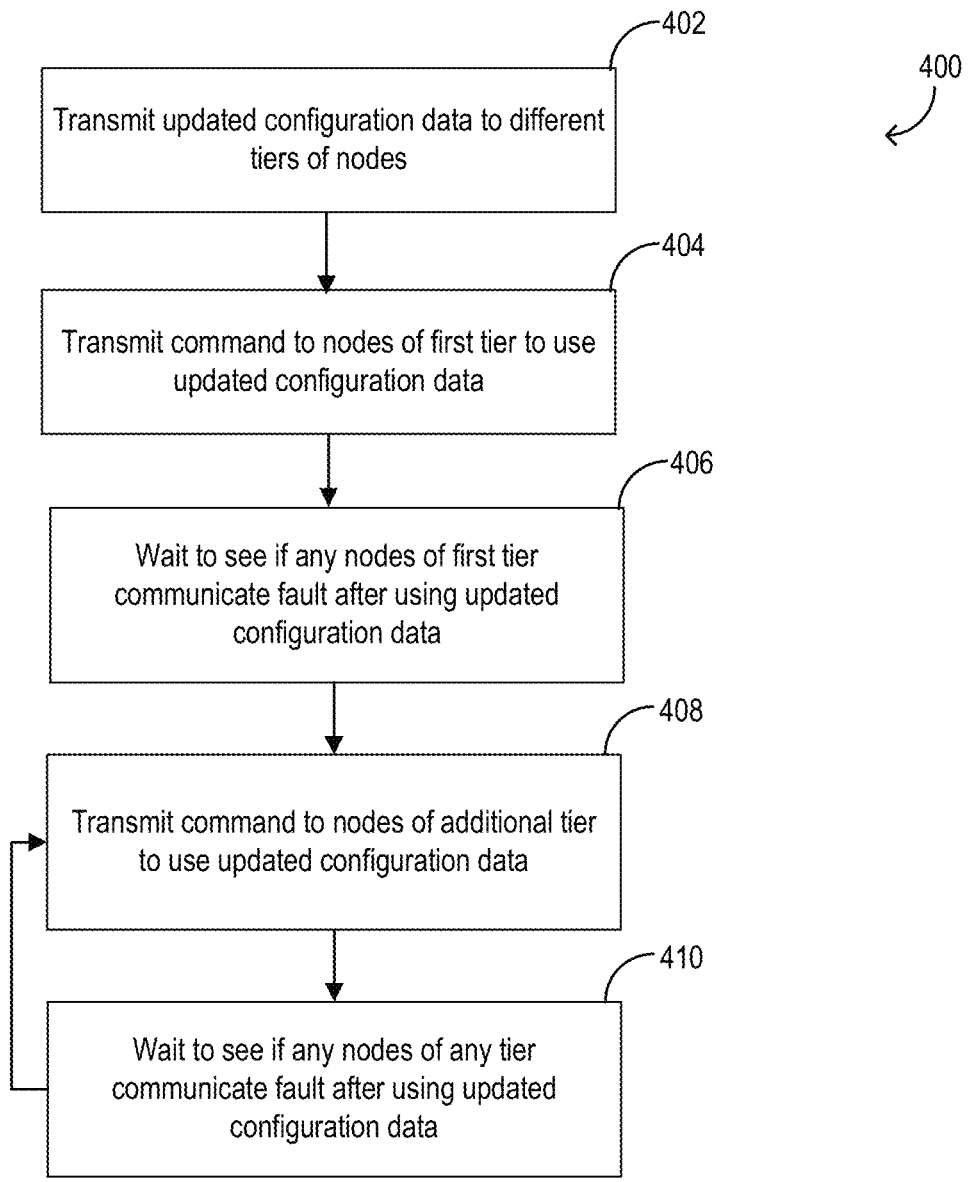
FIG. 4 is a flow diagram illustrating a method for tiered updating of configuration data in a CDN, according to various embodiments.

Any suitable one or more computers or processing circuits within CDN 100 or a node therein, such as described with reference to FIGS. 1, 2A-2E, and 3, or any other suitable computer or processing circuit, may be configured for use in a method for tiered updating of configuration data in a manner such as provided herein. For example, FIG. 4 is a flow diagram illustrating a method 400 for tiered updating of configuration data in a CDN including nodes, according to various embodiments. Method 400 described with reference to FIG. 4 may be implemented by any suitable computer including a processor, a storage device, and a network interface. In some examples, method 400 is performed by control core 110 which may be configured in a manner such as described with reference to FIGS. 1, 2A-2E, and 3.

Method 400 illustrated in FIG. 4 may include transmitting updated configuration data to different tiers of nodes (operation 402). For example, control core 110 respectively may transmit updated configuration data to different tiers of the nodes 130, 140 at the same time as one another, or at different times than one another. Method 400 illustrated in FIG. 4 may include transmitting a command to the nodes of a first tier to use the updated configuration data (operation 404). For example, the first tier of nodes may be using earlier "A" configuration data, and control core 110 may command the first tier of nodes to begin to use updated "B" configuration data. The nodes of the first tier may not handle content requests, or may receive content requests from clients that are operated solely to test the operation of the CDN with the updated configuration data.

Method 400 illustrated in FIG. 4 may include waiting to see if any nodes of the first tier communicate fault after using the updated configuration data (operation 406). Method 400 illustrated in FIG. 4 may include, after such waiting, sequentially repeating operations for each of the additional tiers in the CDN. Such operations may include transmitting to the nodes of that additional tier to use the updated configuration data (operation 408), and then waiting to see if the nodes of the first tier or of any additional tier communicate fault after using the updated configuration data (operation 410). If no such fault is communicated, then operations 408 and 410 are repeated so as to transmit a command to the nodes of another additional tier to use the updated configuration data, followed by waiting to see if any nodes of any tier communicate a fault after using the updated configuration data, before commanding the nodes of yet another tier to use the updated configuration data, for the remaining tiers of nodes in the CDN. For example, in a manner such as described with reference to FIGS. 1 and 2A-2E, control core 110 sequentially may command different tiers, one at a time and at times that are suitably spaced from one another, to begin to use the updated configuration data so long as any nodes already using the updated configuration data do not misbehave. If any nodes of any tier communicate a fault after using the updated configuration data, control core 110 may or may not command any further additional tiers to use the updated configuration data. For example, if the fault is related to the updated configuration data, control core 110 may be used to stop the rollout of that configuration data; or, as noted above, a fault may be determined to be unrelated to the updated configuration data, in which case control core 110 may safely continue the rollout of that configuration data. The amount of time for which control core 110 waits may be referred to as a "spaced interval" and may be the same or different between commands sent to different tiers of nodes. Additionally, control core 110 may command the nodes of any suitable tier to revert to using earlier configuration data.

It will be appreciated that the operations described with reference to FIG. 4 may be implemented in any suitable order. For example, the control core 110 may transmit updated configuration data to any of the tiers at the same time, or at a different time, at which the control core transmits a command to that tier to use the updated configuration data. As such, nodes of a given tier may store the updated configuration data for a period of time before being commanded to use the updated configuration data. Furthermore, if nodes in an earlier tier that is using the updated configuration data misbehave, then the updated configuration data may not be used at all by nodes in a later tier. Instead, control core 110 may transmit to those and other tiers of nodes a new version of updated configuration data for use, e.g., as part of a tiered rollout such as provided herein.

It further will be appreciated that because nodes store both earlier and updated versions of configuration data, control core 110 may command those nodes to use either of the versions at any suitable time. For example, regardless of the particular tier to which a given node is mapped or the status of the tiered rollout of the updated version, control core 110 may command that node to use a specific version of the configuration data at any time. Illustratively, control core 110 may command one or more of the nodes to use a specific version of the configuration data whenever handling a request for content from a particular customer. Commands to use a specific version of the configuration data also or alternatively may be appended (e.g., as special headers) to content requests; as those content requests are passed between nodes in CDN 100, each node may use the version of the configuration data as specified in the commands appended to the content requests. The nodes may be configured such that, absent such commands, the nodes by default use the version of the configuration data that control core 110 otherwise has commanded their tier to use.

The present systems and methods may be adapted for use in any kind of computer network, and are not limited to use in a CDN. For example, any kind of computer (e.g., server or client) may receive software updates from a server, and any given one of the software updates may or may not be faulty. The server may be configured to distribute the software updates in a tiered manner such as provided herein. For example, the server may include a processor and a network interface and the processor may be configured to implement operations that include transmitting updated configuration data to different tiers of computers; transmitting a command to the computers of a first tier of computers to use the updated configuration data; and after waiting to see if the computers of the first tier communicate a fault after using the updated configuration data, sequentially repeating operations for each of the additional tiers in the network. Such operations may include transmitting a command to the computers of that additional tier to use the updated configuration data; and, after waiting to see if the computers of any tier communicate a fault after using the updated configuration data, transmitting a command to the computers of another tier to use the updated configuration data.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices, such as one or more primary storage devices or secondary storage devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, ASICs, FPGAs, DSPs, or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the system, for example the one or more processors may be a remote processor (e.g., a cloud based processor). Alternatively or additionally, the one or more processors may be internal and/or local to the system. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computer, special purpose computer, or special purpose processing machine including a processing unit, a system memory device, and a system bus that couples various system components including the system memory device to the processing unit. The system memory may be or include the primary storage device and/or the secondary storage device. One or more of the system memory, primary storage device, and secondary storage device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and embodiment of the principles without departing from the scope of the present disclosure as expressed in the appended claims.

What is claimed is:
1. A method for updating configuration data in a content delivery network (CDN) comprising nodes, the method implemented by a computer and comprising:
transmitting updated configuration data to different tiers of the nodes;

transmitting a command to the nodes of a first tier to use the updated configuration data;
after waiting to see if any nodes of the first tier communicate a fault after using the updated configuration data, sequentially repeating, for each of the additional tiers in the CDN:
transmitting a command to the nodes of that additional tier to use the updated configuration data; and
after waiting to see if any nodes of any tier communicate a fault after using the updated configuration data, transmitting a command to the nodes of another additional tier to use the updated configuration data.

2. The method of claim 1, wherein the nodes of the first tier do not handle content requests.

3. The method of claim 1, wherein the nodes of the first tier receive content requests from clients that are operated solely to test the operation of the CDN with the updated configuration data.

4. The method of claim 1, wherein the updated configuration data respectively is transmitted at different times to the different tiers of nodes.

5. The method of claim 1, further comprising, responsive to any nodes of any tier communicating a fault after using the updated configuration data, commanding the nodes of at least that tier to revert to earlier configuration data and not commanding any additional tiers of nodes to use the updated configuration data.

6. The method of claim 5, wherein commanding a node to revert to earlier configuration data comprises commanding that node to use an archive stored at that node to identify and use the earlier configuration data.

7. The method of claim 1, wherein nodes that handle content requests are mapped onto one of the additional tiers based on node identifiers.

8. The method of claim 1, wherein nodes that handle content requests are mapped onto one of the additional tiers based on a business rule.

9. The method of claim 8, wherein the business rule includes one or more of: a sensitivity of the node to network traffic, that node's geographical area, a level of network traffic in that node's geographical area, a priority of a customer distributing content through that node, and a type of content being distributed through that node.

10. The method of claim 1, wherein at least some of the additional tiers include different numbers of nodes than one another.

11. The method of claim 1, wherein the computer comprises a control core of the CDN.

12. A computer system comprising a processor and a network interface, the processor being configured to implement operations comprising:
transmitting updated configuration data to different tiers of nodes;
transmitting a command to the nodes of a first tier to use the updated configuration data;
after waiting to see if any nodes of the first tier communicate a fault after using the updated configuration data, sequentially repeating, for each of the additional tiers in the CDN:
transmitting a command to the nodes of that additional tier to use the updated configuration data; and
after waiting to see if any nodes of any tier communicate a fault after using the updated configuration data, transmitting a command to the nodes of another additional tier to use the updated configuration data.

13. The computer system of claim 12, wherein the nodes of the first tier do not handle content requests.

14. The computer system of claim 12, wherein the nodes of the first tier receive content requests from clients that are operated solely to test the operation of the CDN with the updated configuration data.

15. The computer system of claim 12, wherein the updated configuration data is transmitted at different times to the tiers of nodes.

16. The computer system of claim 12, the operations further comprising, responsive to any nodes of any tier communicating a fault after using the updated configuration data, commanding the nodes of at least that tier to revert to earlier configuration data and not commanding any additional tiers of nodes to use the updated configuration data.

17. The computer system of claim 16, wherein commanding a node to revert to earlier configuration data comprises commanding that node to use an archive stored at that node to identify and use the earlier configuration data.

18. The computer system of claim 12, wherein nodes that handle content requests are mapped onto one of the additional tiers based on node identifiers.

19. The computer system of claim 12, wherein nodes that handle content requests are mapped onto one of the additional tiers based on a business rule.

20. The computer system of claim 19, wherein the business rule includes one or more of: a sensitivity of the node to network traffic, that node's geographical area, a level of network traffic in that node's geographical area, a priority of a customer distributing content through that node, and a type of content being distributed through that node.

21. The computer system of claim 12, wherein at least some of the additional tiers include different numbers of nodes than one another.

22. The computer system of claim 12, wherein the computer system comprises a control core of a content delivery network (CDN).

23. A method for updating configuration data in a network, the method implemented by a computer and comprising:
transmitting updated configuration data to different tiers of computers;
transmitting a command to the computers of the first tier to use the updated configuration data;
after waiting to see if any computers of the first tier communicate a fault after using the updated configuration, sequentially repeating, for each of the additional tiers in the network:
transmitting a command to the computers of that additional tier to use the updated configuration data; and
after waiting to see if any computers of any tier communicate a fault after using the updated configuration data, transmitting a command to the computers of another additional tier to use the updated configuration data.

24. A computer system comprising a processor and a network interface, the processor being configured to implement operations comprising:
transmitting updated configuration data to different tiers of computers;
transmitting a command to the computers of the first tier to use the updated configuration data;
after waiting to see if any computers of the first tier communicate a fault after using the updated configuration, sequentially repeating, for each of the additional tiers in the network:
transmitting a command to the computers of that additional tier to use the updated configuration data; and after waiting to see if any computers of any tier communicate a fault after using the updated configuration data, transmitting a command to the computers of another additional tier to use the updated configuration data.

\* \* \* \* \*